S. A. STINSON.
REDUCING VALVE.
APPLICATION FILED JUNE 13, 1911.

1,040,807.

Patented Oct. 8, 1912.
2 SHEETS—SHEET 1.

WITNESSES
Howard E. Thompson
Walton Harrison

INVENTOR
Spencer A. Stinson
BY Munn & Co
ATTORNEYS

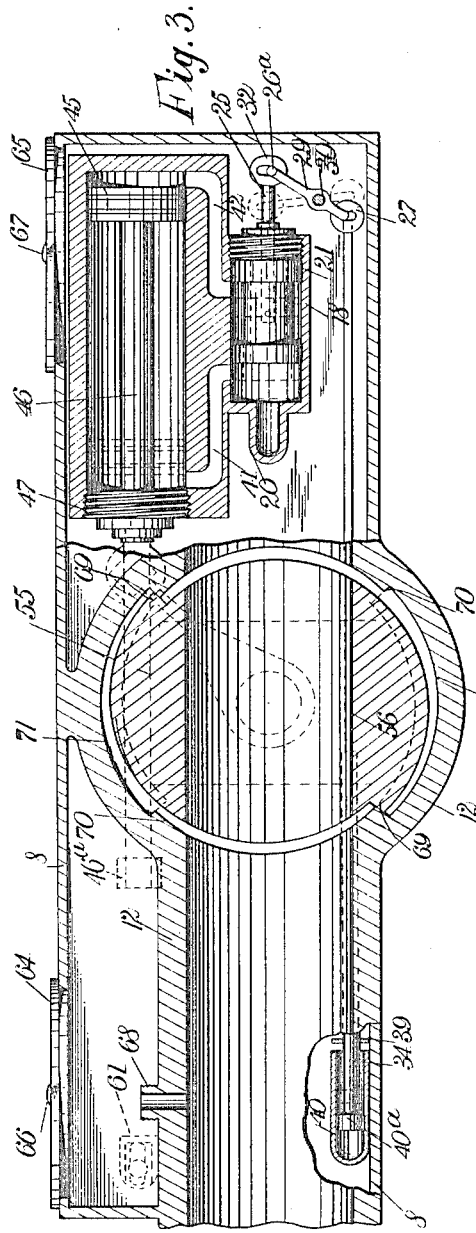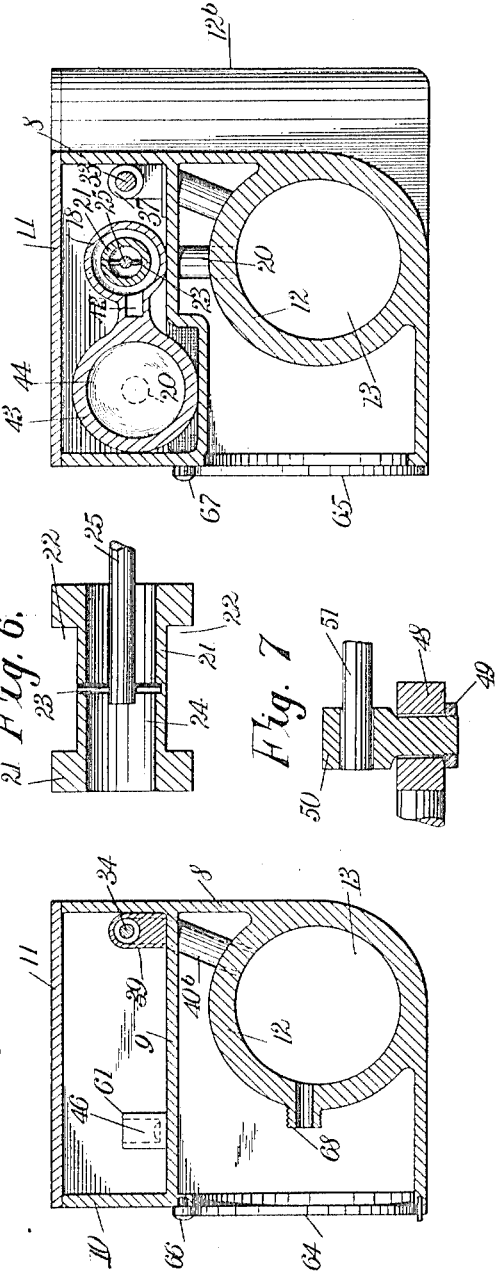

UNITED STATES PATENT OFFICE.

SPENCER A. STINSON, OF BLAIRSTOWN, NEW JERSEY.

REDUCING-VALVE.

1,040,807.  Specification of Letters Patent.  Patented Oct. 8, 1912.

Application filed June 13, 1911. Serial No. 632,915.

*To all whom it may concern:*

Be it known that I, SPENCER A. STINSON, a citizen of the United States, and a resident of Blairstown, in the county of Warren and State of New Jersey, have invented a new and Improved Reducing-Valve, of which the following is a full, clear, and exact description.

My invention relates to reducing valves, my more particular purpose being to provide a valve of this kind having a great variety of uses and being of simple structure and also being capable of handling the flow of liquids in large quantities as well as in high, low or varying pressure.

Reference is to be had to the accompanying drawings in which like characters of reference indicate corresponding parts in all the views, and in which—

Figure 1:
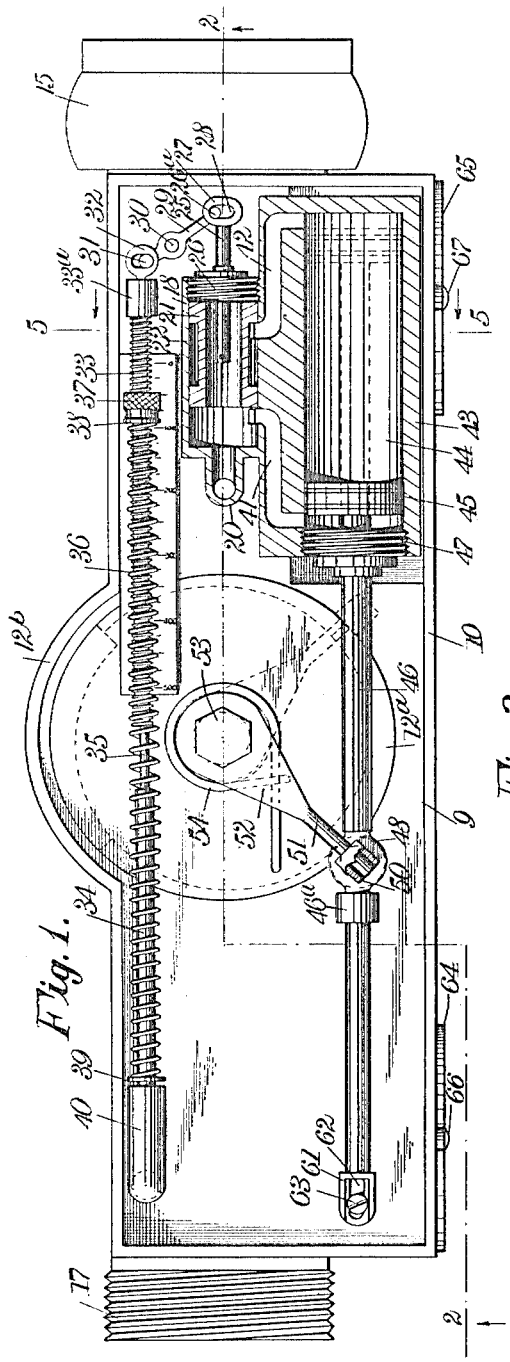
Figure 2:
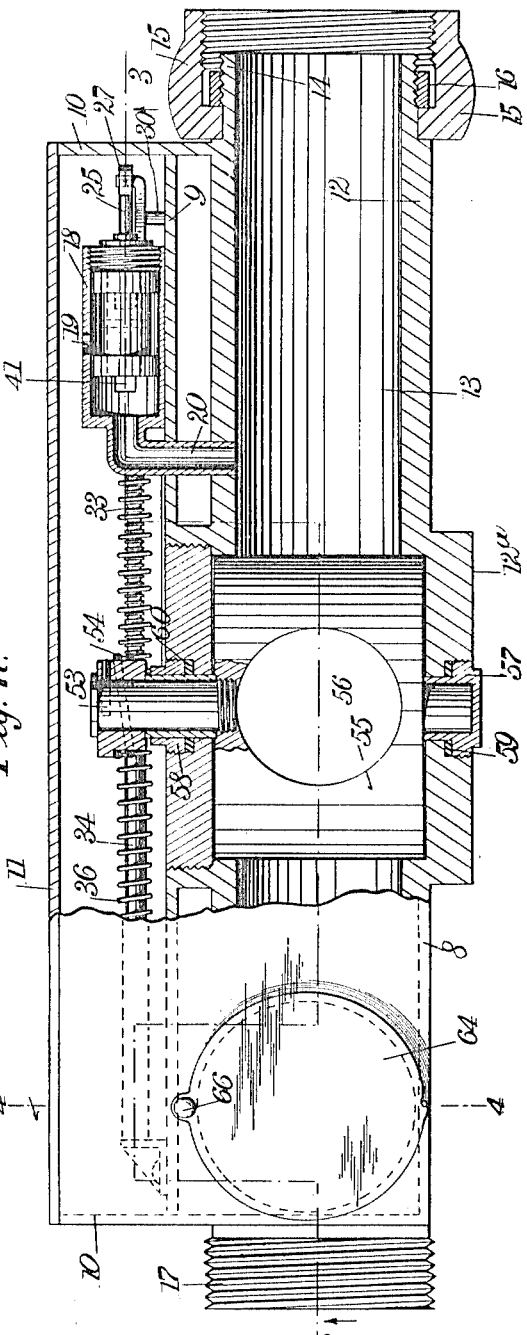

Figure 1 is a view partly in side elevation and partly in section, showing my reducing valve which, in this instance, is closed; that is, in such condition that a liquid can not flow freely through it; Fig. 2 is a section on the line 2—2 of Fig. 1, looking in the direction of the arrow; Fig. 3 is a section on the line 3—3 of Fig. 2, looking in the direction of the arrow, or in other words, looking upward from a point beneath the valve, certain movable parts, however, having changed positions; Fig. 4 is a section on the line 4—4 of Fig. 2, looking in the direction of the arrow; Fig. 5 is a section on the line 5—5 of Fig. 1, looking in the direction of the arrow; Fig. 6 is a detail, being a section through the slide valve; and Fig. 7 is a detail showing how the crank pin of the main valve member is connected with the parts used for actuating it.

A casing 8 is provided with a partition floor 9 and with an extension 10. The casing is further provided with a lid 11 detachably mounted upon the extension 10. A main section 12 practically disposed within the casing, yet integral with it (see Figs. 4 and 5) is provided with a passage 13 and with a threaded nipple 14. Mounted upon the latter is a coupling 15 inclosing a ring 16 for the purpose of connecting the casing to a main section. The casing is further provided with a central housing 12ᵃ having a convex portion 12ᵇ and serving as a valve housing, as hereinafter described. The casing 8 is also provided with a threaded nipple 17 to facilitate its connection with a main. A valve cylinder 18 is provided with a discharge opening 19 and is connected by a pipe 20 with the main section 12.

Slidably mounted within the valve cylinder 18 is a slide valve 21, the structure of which may be readily understood by reference to Fig. 6. This slide valve is provided with an annular passage 22 extending entirely around it, and is further provided with an axial passage 24 of cylindrical form. A pin 23 extends diametrically across the passage 24 at the approximate middle of the valve, and connected to this pin is a valve stem 25, which extends through a head 26 which is threaded externally and fitted into one end of the valve cylinder 18 so as to close the same. The valve stem 25 carries an eye 27 having a slot 28 through it. Extending through this slot is a pin 26ᵃ which is mounted upon a lever 29. This lever is mounted upon a pin 30 and carries another pin 31 which extends through an eye 32, and somewhat similar to the eye 27. A threaded tube is shown at 33 and extends through a head 33ᵃ, to which it is firmly secured, the head 33ᵃ being mounted rigidly upon the casing. A rod 34 is provided with a portion 35 of reduced diameter, this portion extending entirely through the threaded tube 33, and carrying the eye 32. A spiral spring 36 encircles the rod 34 and the threaded tube throughout the greater portion of the length thereof.

Revolubly mounted upon the tube 33 is a nut 37 having a milled outer surface by aid whereof it may be turned. A washer 38 encircles the tube 33 and engages the nut 37. The rod 34 carries a bead 39, against which the adjacent end of the spring 36 presses. A cylinder 40 is mounted upon the casing 8 and contains a small piston 40ᵃ, shown more particularly in Fig. 4, and carried by the rod 34. The cylinder 40 is supported by the casing 8 and by aid of a tubular connection 40ᵇ (see Fig. 4) is in open communication with the main section 12. The rod 34 and the threaded tube 33 are pressed in opposite directions by the spring 36, the threaded tube 33 being stationary, however, and the rod 34 being movable. The arrangement of the parts is such that when a liquid passes from the main section 12 through the tubular connection 40ᵇ and into the cylinder 40 so as to press against the piston 40ᵃ, the rod 34, including its reduced portion 35 is, as a unit, moved to the right according to Fig. 1 so as to shift the position of the lever 29 and cause the slide valve 21 to move to the left according to said figure, thus compressing the spring 36. When, however, there is no pressure in the cylinder 40, or when the pressure therein drops below a predetermined limit controllable by the spring 36, the pressure of the piston 40ª occupies the extreme position to the left according to Fig. 3, and the lever 29 and valve 21 occupy their respective positions indicated in Fig. 1.

A cylinder 43 is provided with ports 41, 42 leading to its ends and to a cylindrical passage 44 with which the cylinder 43 is also provided. Slidably mounted within this passage is a piston 45 and connected to the latter is a piston rod 46 which slidably engages a stationary guide 46ª and extends through a cylinder head 47, the latter being threaded and fitted into the adjacent end of the cylinder 43 so as to close the same. The piston rod 46 is provided with an enlarged portion 48 having generally an annular form. Extending through this annular portion and revolubly thereto, is a pin 49 carrying a sleeve 50. This sleeve is, therefore, swiveled relatively to the piston rod 46. A crank 52 is provided with a smooth cylindrical portion 51 which extends through the sleeve 50 and slidably engages the same. The arrangement of these parts is such that when the piston rod 46 is moved in the general direction of its own length, the sleeve 50 not only turns upon the axis of the pin 49 as a center, but also has a little sliding movement relatively to the cylindrical portion 51 of the crank. The crank 52 is mounted rigidly upon a stub shaft 53, and encircling the latter is a spiral spring 54. One end of this spiral spring is connected with the crank 52, and the opposite end of the spring is connected with the housing of the valve, as will be understood from Fig. 1.

Mounted within the housing 12ª is a valve plug 55 which may be turned into angular positions different from each other by approximately 90 degrees. The valve plug 55 is provided with a straight passage 56 extending diametrically through it and having a diameter substantially equal to that of the passage 13. The valve plug 55, when turned into one of its extreme positions, brings the passage 56 into axial alinement with the passage 13, whereas if the valve plug 55 be turned into its opposite extreme position, the passage 56 travels in the general direction of the length of the passage 13. Closure members 57, 58 and packings 59, 60 are provided for the purpose of preventing the escape of liquid which might otherwise take place.

Adjacent to one end of the rod 46 and in alinement therewith is a bracket 61, the latter having a slot 62 through which extends a set screw 63. The set screw normally holds the bracket 61 rigidly in position and this bracket thus serves as a limiting stop for preventing excessive travel of the piston rod 46 in one direction. By loosening the screw 63, however, the bracket 61 may be adjusted, and after its adjustment it may be held in its new position by tightening the screw. By adjusting the bracket 61 in the manner just described, the play of the piston rod 46, and consequently the degree to which the valve plug 55 may be closed, is controllable at the will of the operator. The function of this bracket 61 is to prevent the valve plug 55 from being forced too tightly into its seat, thus causing it to stick. The eccentric form of the valve plug causes it to be lifted entirely from its seat as it is opened and the only time that it is in contact with the seat is when it is entirely closed, and if it were forced too far around, the eccentric form, would cause it to pinch. The operator, by turning the nut 37, and thus conferring any desired degree of compression upon the spring 36, may regulate to great nicety, the sensitiveness of the control of this device over the pressure and volume of water passing through it, as hereinafter described.

I provide two doors 64, 65 which are suspended directly from pins 66, 67 and by their own weight are normally closed. The operator, by merely shifting one or both of these doors, may readily introduce his hands into the casing, as will be understood from Figs. 4 and 5. The casing 8 is provided with nipples 68 to which pressure gages are attached, these pressure gages being accessible by merely shifting the doors 64, 65.

The valve plug 55 is provided with shoulders 69 which, when the valve is fully open, are in registry with stationary shoulders 70 carried by the housing. Two passages 71, each having generally a slightly tapered form in cross section, as shown in Fig. 3, are so arranged that the shoulders 69 may, without undue friction, be moved around until they engage the fixed shoulders 70. The purpose of this arrangement is, as above stated, to prevent the valve plug 55 from sticking in its mountings. When the parts are in the position indicated in Fig. 3, the contact surface between the valve plug 55 and its mountings is reduced to a minimum. When, however, the valve plug is turned into its opposite extreme position, so that its shoulders 69 lodge against the shoulders 70, the contact surface is increased and this takes place just when the valve is required to be worked, in order to prevent the flow of water or other liquid.

The operation of my device is as follows: The adjustable parts being adjusted as above described, I will suppose that the coupling 15 is connected with a high pressure main, and that the nipple 17 is similarly connected with a low pressure main, and that the liquid operated upon is water. Generally speaking, the purpose of the device is to guard the water pressure and render the latter uniform as the water passes from the high pressure main through the device and into the low pressure main. The spiral spring 54 normally tends to hold the valve plug 55 closed, that is, in the position indicated in Figs. 1 and 2. The water is for the moment, therefore, unable to get through the device. For this reason a small portion of the water is forced through the pipe 20 and into the adjacent end of the valve cylinder 18. The valve 21 now being at the right, as indicated in Figs. 1 and 2, the port 42 is completely covered, while the port 41 is open. The port 42 is open to the exhaust, however, through the annular passage 22 and discharge opening 19. Consequently, the water finds its way down into the port 41 and into the cylinder 43. Here it presses against the piston 45 and tends to move the latter toward the right. This turns the crank 52 in a counter-clockwise direction, according to Fig. 1, and this movement partially turns the valve plug 55, or in other words, partially opens the main valve. A water pressure now begins to develop in that part of the main section 12 to the left of the valve plug 55, according to Figs. 1 and 2. A small quantity of water is thus forced into the cylinder 40 and this portion of the water presses upon the piston 40$^a$, as will be understood from Fig. 3. When the pressure on the piston 40$^a$ becomes high enough to overcome the pressure of the spring 36, the rods 34, 35 move to the right, shifting the position of the lever 29 and of the valve stem 25, so that the valve 21 travels to the left. The tendency of this movement of the valve 21 is to close the port 41, and thus cut it off from the water pressure in the cylinder 18 and to also close the port 42 and cut it off from the exhaust through the annular passage 22 and the discharge opening 19. The valve 21 is so constructed that when it occupies its middle position in the cylinder 18, both ports 41 and 42 are entirely closed, and when it occupies this middle position the piston 45 is held rigidly in the position that it occupied in the cylindrical passage 44 at the time the ports closed. When the piston 45 is held rigidly in one position, it also holds the valve plug 55 rigidly in a corresponding position, and thus a constant uniform flow of water is allowed through the valve plug 55 as long as the pressure in the high pressure main remains constant. The various parts are so adjusted that the valve 21, through its control by the piston 40$^a$ and the spring 36, takes up this middle position in the cylinder 18 when the pressure in the low pressure main reaches any desired amount. Any pressure desired in the low pressure main, from zero to a pressure equal to that in the high pressure main, can be had by turning the milled headed nut 37 and thus compressing or releasing the spring 36. If the pressure in the low pressure main becomes greater than that desired, the piston 40$^a$ is moved farther to the right against the compression in the spring 36, the valve 21 is moved to the left and the port 41 opened to the exhaust through the annular passage 22 and the discharge opening 19, while the port 42 will be opened to the pressure of the water through the tube 20 and the cylindrical passage 24. The pressure will come in to the right of the piston 45 and move it to the left, thus tending to close the valve plug 55 and diminish the amount of water flowing through it. When the pressure in the low pressure main drops to the desired amount, the spring 36 will force the piston 40$^a$ to the left, thus moving the valve 21 to the right until it closes both ports 41 and 42, when the piston 45 and valve plug 55 are held rigidly as before. If the pressure in the low pressure main drops below the desired amount, the action of the various parts is reversed.

If it happens from any cause that the pressure in the low pressure main rises to approximate that of the high pressure main, the tendency of the various spring controlled parts to return to their normal positions will insure a total or partial closure of the main valve, and any substantial reduction in the pressure of the low pressure main will similarly tend to open the main valve to such extent as will correct the undue decrease of pressure. In practice, therefore, the valve plug 55, like the slide valve 21, takes up a floating, yet tolerably steady position, and stands ready to respond instantly to the slightest variation of any kind in the relative pressure of the high pressure and low pressure mains.

Having thus described my invention, what I claim as new and desire to secure by Letters Patent is:—

A reducing valve comprising a casing having a high pressure side and a low pressure side, a main valve mounted within said casing, a piston for actuating said main valve, a cylinder slidably engaged by said piston, a slide valve for controlling the flow of a liquid from the high pressure side of said casing into said cylinder, a lever for actuating said slide valve, a rod connected with said lever, means for causing a liquid from the low pressure side of said casing to move said rod, a sleeve of tubular form encircling said rod and serving as a bearing therefor, a spiral spring encircling a portion of said rod and a portion of said sleeve, a stop engaged by one end of said spring, and a member adjustably mounted upon said sleeve and engaged by the other end of said spring for controlling the tension of said spring.

In testimony whereof I have signed my name to this specification in the presence of two subscribing witnesses.

SPENCER A. STINSON.

Witnesses:
WALTON HARRISON,
JOHN P. DAVIS.